United States Patent [19]
Yuo et al.

[11] Patent Number: 5,608,032
[45] Date of Patent: Mar. 4, 1997

[54] CATALYTIC COMPOSITIONS FOR THE PROPARATION OF POLY(ETHYLENE TEREPHTHALATE) WITH ATTENUATED YELLOW COLOR

[75] Inventors: Wu-Bin Yuo, Hsinchu; Jong-Wu Chen, Do-Lio; Yu-Shan Chao, Hsinchu, all of Taiwan

[73] Assignee: Industrial Technology Research Institute, Hsinchu, Taiwan

[21] Appl. No.: 413,027

[22] Filed: Mar. 28, 1995

[51] Int. Cl.$^6$ .......................... C08G 63/00; C08G 63/02; C08G 63/78; C08G 63/82

[52] U.S. Cl. .......................... 528/286; 502/153; 502/155; 502/161; 502/171; 502/208; 502/353; 528/193; 528/194; 528/271; 528/272; 528/274; 528/275; 528/277; 528/278; 528/280; 528/281; 528/283; 528/285; 526/71

[58] Field of Search ...................................... 502/153, 155, 502/161, 170, 171, 195, 208, 353; 528/193, 194, 271, 272, 274, 275, 280, 281, 283, 285, 277, 278, 286; 526/71

[56] References Cited

U.S. PATENT DOCUMENTS

| | | | |
|---|---|---|---|
| 5,008,230 | 4/1991 | Nichols | 502/170 |
| 5,019,640 | 5/1991 | Engel-Bader et al. | 528/272 |
| 5,116,938 | 5/1992 | Engel-Bader et al. | 528/272 |
| 5,135,697 | 8/1992 | Roderiguez et al. | 264/210.6 |
| 5,153,164 | 10/1992 | Mason | 502/324 |
| 5,162,488 | 11/1992 | Mason | 528/275 |
| 5,166,311 | 11/1992 | Nichols | 528/285 |
| 5,250,333 | 10/1993 | McNeely et al. | 428/35.7 |
| 5,272,246 | 12/1993 | Roderiguez et al. | 528/272 |
| 5,340,909 | 8/1994 | Doerr et al. | 528/276 |

FOREIGN PATENT DOCUMENTS

| | | |
|---|---|---|
| 0399742 | 11/1990 | European Pat. Off. |
| 0399799 | 11/1990 | European Pat. Off. |
| 1135233 | 12/1968 | United Kingdom . |

OTHER PUBLICATIONS

PBT–Dialog research 109: 746272 vol. 109 (1988) Abstract.
PET–Dialog research 87: 168630 abstract (1994).
PET–Dialog research 115: 136993 abstract (1994).
"Antimony Compounds" *Encyclopedia of Chemical Technology* vol. 3 (1978) pp. 107–108.

*Primary Examiner*—Terressa Mosley
*Attorney, Agent, or Firm*—W. Wayne Liauh

[57] ABSTRACT

A catalyst composition for use in a polycondensation reaction for making poly(ethylene terephthalate) from terephthalic acid comprising: (a) an antimony salt catalyst present in a range from about 10 to about 1,000 ppm; (b) a metal salt catalyst of at least one of cobalt, magnesium, zinc, manganese, calcium, and lead, present in a range from about 10 to about 500 ppm; and (c) a phosphorus salt co-catalyst selected from the group consisting of alkali metal phosphates, alkali metal phosphites, alkali metal hypophosphites and alkali metal polyphosphates, present in a range from about 10 to about 500 ppm; all amounts are based on the metallic or phosphorus element relative to the theoretical yield of the poly(ethylene terephthalate), by weight, to be made from the terephthalic acid. The catalyst composition was found to have increased the reaction rate in the production of poly(ethylene terephthalate), as well as improved the color of the produced product, by reducing the degree of yellowness in the final poly(ethylene terephthalate) product. Attenuation of the yellowish color indicates a reduction in the amount of undesired side reaction product.

18 Claims, 1 Drawing Sheet

Fig. 1

CATALYTIC COMPOSITIONS FOR THE PROPARATION OF POLY(ETHYLENE TEREPHTHALATE) WITH ATTENUATED YELLOW COLOR

FIELD OF THE INVENTION

The present invention relates to a novel catalytic composition for the preparation of poly(ethylene terephthalate). More specifically, the present invention relates to a novel catalyst composition for accelerating the polymerization rates during the preparation of poly(ethylene terephthalate) from terephthalic acid and ethylene glycol, with attenuated amounts of side reaction products, which typically appear as yellowish color.

BACKGROUND OF THE INVENTION

Poly(ethylene terephthalate), or PET, is one of the most important synthetic fibers as well as one of the most important engineering plastics. As a synthetic fiber, it can be used separately as long and short fibers or as various types of industrial fibers; it can also be used jointly with cotton or silk fibers in making consumer clothing. As an engineering plastics, poly(ethylene terephthalate) has a wide variety of industrial applications, and can be used in making bottles as well as microwavable kitchen wares. Poly(ethylene terephthalate) also finds many important applications in the food and electronic packing industries.

Poly(ethylene terephthalate) is manufactured commercially by the so-called DMT (dimethyl terephthalate) or TPA (terephthalic acid) process. In the early stage of the development of poly(ethylene terephthalate), because of the inadequate purity of the terephthalic acid raw material, poly(ethylene terephthalate) was manufactured primarily from the DMT process. In the past decades, as the purity of terephthalic acid has substantially improved, the TPA process becomes the predominate process for the commercial production of poly(ethylene terephthalate).

In the conventional DMT process for making poly(ethylene terephthalate), dimethyl terephthalate (DMT) and ethylene glycol (EG) are used as the raw material which are reacted at 220°~260° C., using at least one acetate of manganese, calcium, or zinc as the catalyst to accelerate the tranesterification reaction, which forms an intermediate product, bis(2-hydroxyethyl terephthalate) (BHET). The intermediate product, bis(2-hydroxybutyl terephthalate) is then subject to a high temperature (250°~290° C.) and high vacuum (less than 1 torr) polymerization, in the presence of a diantimony trioxide ($Sb_2O_3$) or antimony acetate ($Sb(OAc)_3$) catalyst. After the completion of the condensation polymerization reaction, the unreacted ethylene glycol is removed from the products to obtain the poly(ethylene terephthalate) final product.

The TPA process has become the predominate process for the commercial production of poly(ethylene terephthalate). In the conventional TPA process, terephthalic acid (TPA) and ethylene glycol are used as the raw material which are reacted at 220°~265° C. to effectuate an esterification reaction. The acidic terephthalic itself serves as the catalyst. After condensation (dehydroxylation) as a result of the esterification reaction, an intermediate product of bis(2-hydroxyethyl terephthalate) is formed. The intermediate product of bis(2-hydroxyethyl terephthalate) is similarly subject to a high temperature (250°~290° C.) and high vacuum (less than 1 torr) polymerization using diantimony trioxide or antimony acetate as the catalyst. After the reaction, the unreacted ethylene glycol is removed to obtain the poly(ethylene terephthalate) final product.

Currently, the commercial processes in making poly(ethylene terephthalate) also can be classified into two types: batch process and continuous process. In the batch process, the esterification and polymerization reactions are conducted in separate steps-the esterification is proceeded in an esterification vessel, and the intermediate reaction products from the esterification reaction are removed to a polymerization vessel to carry out the polymerization reaction. In the continuous process, typically five reaction vessels-this compares to the two reaction vessels used in the batch process. Esterification reaction is carried out in the first two reaction vessels, the third reaction vessel is used for pre-polymerization, and the polymerization reaction is conducted in the last two reaction vessels.

One of the problems encountered in the production of poly(ethylene terephthalate) is the production of side reaction products, which typically appear as having a yellowish color. This problem is more profound with the TPA process. It has been observed that the faster the reaction rate, the greater the amount of the side reaction products that are produced. The presence of the side reaction products also causes the poly(ethylene terephthalate) to be tainted with an undesirable and unpleasant yellow color.

Great Britain Pat. No. 1,135,233 teaches a process for the production of fiber-forming polyesters, i.e., poly(ethylene terephthalate), from terephthalic acid in which acetates of manganese or cobalt, or diantimony trioxide is used as a catalyst, and triphenyl phosphate is added as a stabilizer. Japan Laid-Open Pat. App. JP 79-146,893 teaches a catalyst composition containing tetramethyl titanate, cobalt acetate and calcium acetate which improves the yellow color problem observed during the production of poly(ethylene terephthalate) from terephthalic acid. Japan Laid-Open Pat. App. JP 79-163,996 teaches a catalyst composition containing diantimony trioxide, dibutyl tin diacetate, magnesium acetate and calcium acetate which also improves the yellow color problem observed during the production of poly(ethylene terephthalate) from terephthalic acid. Japan Laid-Open Pat. App. JP 80-116,722 teaches a catalyst composition containing diantimony trioxide, cobalt acetate, manganese acetate and trimethyl phosphate which reduces the yellow color problem observed during the production of poly(ethylene terephthalate) from terephthalic acid and decreases the rate of back pressure increase during melting spinning. Japan Laid-Open Pat. App. JP 80-120,623 teaches the use of a phosphoric acid as stabilizer when a catalyst composition containing diantimony trioxide, cobalt acetate and calcium acetate during the production from terephthalic acid of poly(ethylene terephthalate), which exhibits improved wovability.

Eur. Pat. App. EP 399,742 discloses a catalyst system including: (1) zinc and/or cobalt; (2) at least one of zinc, magnesium, manganese and calcium; and (3) antimony. Eur. Pat. App. EP 399,799 discloses a direct esterification of terephthalic acid with ethylene glycol followed by the polycondensation of the ester product using a catalyst system containing cobalt, manganese, and antimony components, and using a diethyl acid phosphate as a stablizer; the prepared poly(ethylene terephthalate) having a predetermined intrinsic viscosity.

U.S. Pat. Nos. 5,001,216, 5,008,230, 5,077,259, 5166,311, 5,153,164, and 5,162,488 teach a catalyst system for the production of poly(ethylene terephthalate) from terephthalic acid and ethylene glycol, wherein the catalyst containing antimony, cobalt, and/or zinc, and at least one of zinc, magnesium, manganese or calcium. In these patents, it is taught that, by using the disclosed catalyst system, the reaction rate from terephthalic acid to poly(ethylene terephthalate) can be increased relative to the conventional catalyst, which contains only antimony component (i.e., diantimony trioxide). None of these patents, however, discusses the yellowing problems associated with the use of catalyst to accelerate the esterification/polymerization reaction.

SUMMARY OF THE INVENTION

The primary object of the present invention is to develop an improved catalyst composition for the preparation of poly(ethylene terephthalate). More specifically, the primary object of the present invention is to develop an improved catalyst composition, which will satisfactorily accelerate the condensation polymerization rates during the preparation of poly(ethylene terephthalate), while minimizing or eliminating the yellowish color as well as minimizing or eliminating the production of the side reaction products. Alternatively, the primary object of the present invention is to develop an improved process, which utilizes an improved catalyst composition, for accelerating the production rate of poly(ethylene terephthalate) from terephthalic acid, while minimizing or eliminating the yellowish color as well as minimizing or eliminating the production of the undesired side reaction products.

The improved catalyst composition disclosed in the present invention contains (1) about 10 to 1,000 ppm, by weight, of the theoretical value of poly(ethylene terephthalate) to be produced, of an antimony component; (2) about 10 to 500 ppm, by weight, of the theoretical value of poly(ethylene terephthalate) to be produced, of at least one of manganese, magnesium, zinc, cobalt, zinc, or lead component; and (3) about 10 to 500 ppm, by weight, of the theoretical value of poly(ethylene terephthalate) to be produced, of an alkali metal phosphate, alkali metal phosphite, alkali metal hypophosphite or alkali metal polyphosphate.

The alkali metal phosphate that can be used in the present invention can be a phosphate salt containing one, two, or three alkali metal groups. The alkali metal phosphite can be a phosphite salt containing one or two alkali metal groups. The alkali metal hypophosphite can be a hypophosphite salt containing any number of alkali metal groups. The alkali metal polyphosphate can be a polyphosphate salt containing one, two, three, four, or five alkali metal groups. The improved catalyst composition disclosed in the present invention not only increases the reaction rate in the production of poly(ethylene terephthalate), it also improves the color of the produced product. The poly(ethylene terephthalate) produced using the catalyst composition disclosed in the present invention shows a slightly bluish color (low b-value or negative b-value). A bluish color is preferred over the yellowish color for the commercial poly(ethylene terephthalate) products. Attenuation of the yellowish color indicates a reduction in the amount of undesired side reaction product.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

Figure 1:
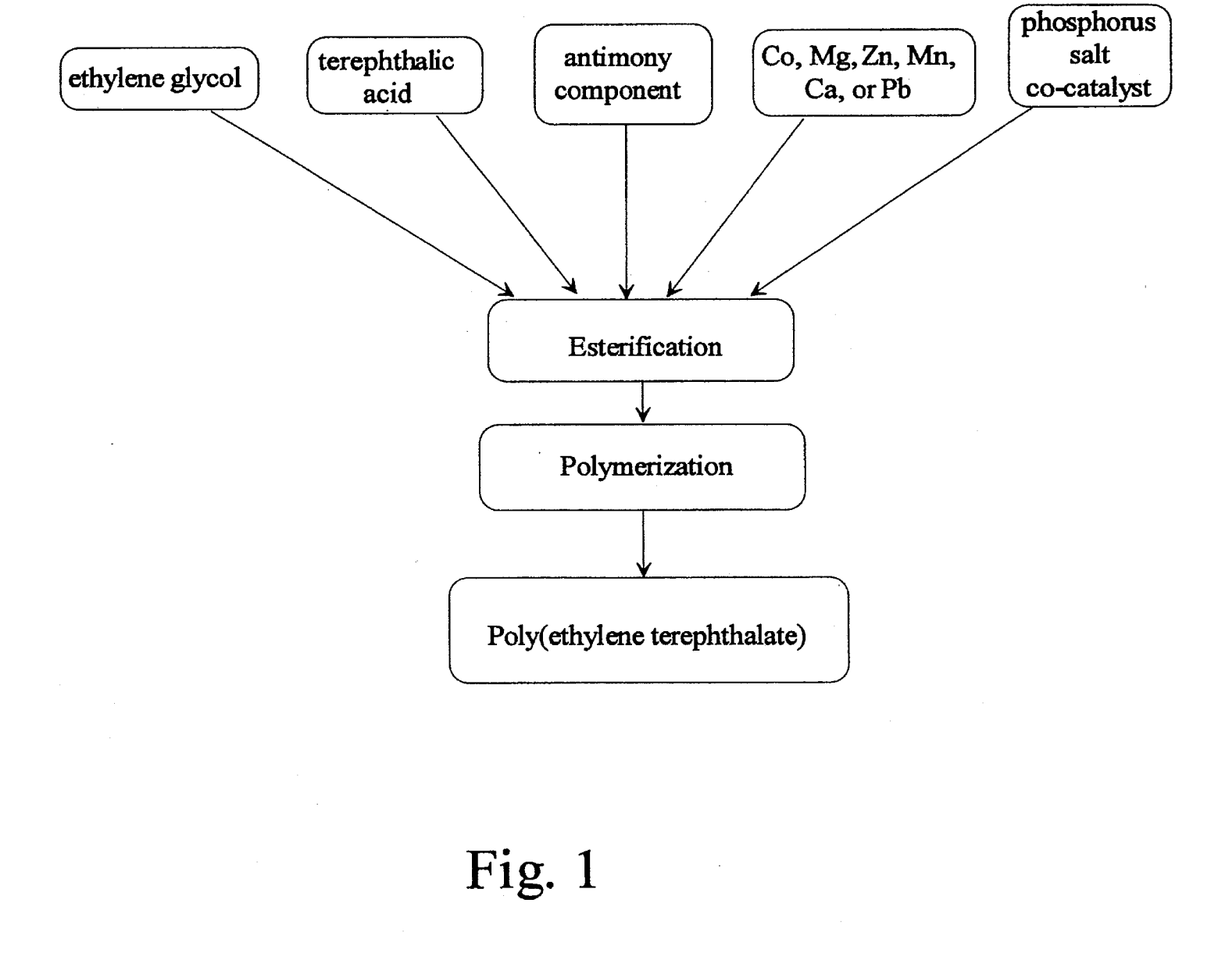
FIG. 1 is schematic diagram showing a preferred embodiment of the process disclosed in the present invention in making poly(ethylene terephthalate) from terephthalic acid and ethylene glycol.

The present invention discloses an improved catalyst composition for accelerating the condensation polymerization rates during the preparation of poly(ethylene terephthalate), while minimizing or eliminating the yellowish color as well as minimizing or eliminating the production of the side reaction products. The improved catalyst composition disclosed in the present invention contains: (1) about 10 to 1,000 ppm of an antimony component; (2) about 10 to 500 ppm of at least one of manganese, magnesium, zinc, cobalt, zinc, or lead component; and (3) about 10 to 500 ppm of an alkali metal phosphate, alkali metal phosphite, alkali metal hypophosphite or alkali metal polyphosphate. The amounts of the catalytic components are based on parts of the active element per one million parts, by weight, of the theoretical value of poly(ethylene terephthalate) to be produced.

In the catalyst composition disclosed in the present invention, the alkali metal phosphate can be a phosphate salt containing one, two, or three alkali metal groups; the alkali metal phosphite can be a phosphite salt containing one or two alkali metal groups; the alkali metal hypophosphite can be a hypophosphite salt containing any number of alkali metal groups; and the alkali metal polyphosphate can be a polyphosphate salt containing one, two, three, four, or five alkali metal groups. The improved catalyst composition disclosed in the present invention not only increases the reaction rate in the production of poly(ethylene terephthalate), it also improves the color of the produced product. The poly(ethylene terephthalate) produced using the catalyst composition disclosed in the present invention shows a reduction in the yellowness and a slightly bluish color (low b-value or negative b-value). Attenuation of the yellowish color indicates a reduction in the amount of undesired side reaction product.

The present invention will now be described more specifically with reference to the following examples. It is to be noted that the following descriptions of example including preferred embodiment of this invention are presented herein for purpose of illustration and description; it is not intended to be exhaustive or to limit the invention to the precise form disclosed.

COMPARATIVE EXAMPLE 1

Terephthalic acid and ethylene glycol, in a molar ratio of 1:1.2, and a catalyst composition as shown in Table 1, were added to a reaction vessel. The catalyst composition (described as Sb/Co/Mn=300/30/88 in Table 1) contained 300 ppm diantimony trioxide, 30 ppm cobalt acetate, and 88 ppm manganese acetate. The content of each component in the catalyst composition was based on the metal element relative to the theoretical value of poly(ethylene terephthalate) to be produced. The reaction vessel was repeatedly (at least three times) pressurized by nitrogen to 3~5 kg/cm², then released to 0 kg/cm², to purge air and oxygen. The thermal bath containing the reaction vessel was set at 290° C. Reaction time was began when a stirrer was set at 60 RPM to begin esterification, wherein the temperature of the fractional distillation column was set at 150° C. The reaction vessel was maintained at a nitrogen pressure of 3 kg/cm². Reaction samples were collected and analyzed. After the esterification reached 80% completion, the nitrogen pressure in the reaction vessel was gradually released (in about three minutes).

Thereafter, the temperature of the thermal bath was raised to 300° C. A regular vacuum pump was used to pull vacuum from the reaction vessel and begin a pre-polymerization reaction. The vacuuming was conducted in eight stages of 10, 20, 30, 40, 50, 60, 70, and 74 of the vacuum gauge, each stage took about five minutes, and the total vacuuming took about 40 minutes. After the pre-polymerization stage, a high-vacuum pump was connected to the reaction vessel to pull a high vacuum in the reaction vessel. The reaction vessel was thus maintained at a high vacuum of 0.4~0.5 torr to begin the polymerization reaction. After the voltage connected to the stirrer raised to a certain value, the reaction was stopped, and the content in the reaction vessel was removed.

The poly(ethylene terephthalate) prepared from the above procedure was analyzed for their color, and the results are summarized in Table 1. In Table 1, the L-value indicates the degree of whiteness, a plus 100 L-value indicates pure white and a negative 100 L-value indicates complete black. The b-value indicates the degree of yellowness, a small or negative b-value indicates less yellowness, or a bluish color. The measured L and b values from Comparative Example 1 are 78.4 and 3.3, respectively.

The poly(ethylene terephthalate) prepared from Comparative Example 1 was measured for its intrinsic viscosity (I.V.) using a Cannon No. 150 viscometer at a temperature of 30°±0.1° C. In making the measurement, the poly(ethylene terephthalate) was dissolved in a solvent containing phenol/tetrachloroethane in a ratio of 6/4 by weight. The measured intrinsic viscosity, which is summarized in Table 1, was 0.65 dl/g.

EXAMPLE 1

The procedure in making poly(ethylene terephthalate) in Example 1 was identical to that described in Comparative Example 1, except that the catalyst composition (described as Sb/Co/Mn/P=300/30/88/47A in Table 1) contained 300 ppm antimony (in diantimony trioxide), 30 ppm cobalt (in cobalt acetate), 88 ppm manganese (in manganese acetate), and 47 ppm phosphorus (in sodium tripolyphosphate).

The poly(ethylene terephthalate) prepared from Example 1 was analyzed for their color and intrinsic viscosity, and the results are summarized in Table 1. The measured L and b values and the measured intrinsic viscosity from Example 1 are 82.4, 0.6, and 0.66 dl/g, respectively.

EXAMPLE 2

The procedure in making poly(ethylene terephthalate) in Example 2 was identical to that described in Comparative Example 1, except that the catalyst composition (described as Sb/Co/Mn/P=300/30/88/53 in Table 1) contained 300 ppm antimony (in diantimony trioxide), 30 ppm cobalt (in cobalt acetate), 88 ppm manganese (in manganese acetate), and 53 ppm phosphorus (in sodium dihydrogen phosphate).

The poly(ethylene terephthalate) prepared from Example 2 was analyzed for their color and intrinsic viscosity, and the results are summarized in Table 1. The measured L and b values and the measured intrinsic viscosity from Example 2 are 80.9, 2.9, and 0.66 dl/g, respectively.

EXAMPLE 3

The procedure in making poly(ethylene terephthalate) in Example 3 was identical to that described in Comparative Example 1, except that the catalyst composition (described as Sb/Co/Mn/P=300/30/88/28 in Table 1) contained 300 ppm antimony (in diantimony trioxide), 30 ppm cobalt (in cobalt acetate), 88 ppm manganese (in manganese acetate), and 28 ppm phosphorus (in sodium phosphate).

The poly(ethylene terephthalate) prepared from Example 3 was analyzed for their color and intrinsic viscosity, and the results are summarized in Table 1. The measured L and b values and the measured intrinsic viscosity from Example 3 are 79.7, 3.1, and 0.65 dl/g, respectively.

EXAMPLE 4

The procedure in making poly(ethylene terephthalate) in Example 4 was identical to that described in Comparative Example 1, except that the catalyst composition (described as Sb/Co/Mn/P=300/30/88/47B in Table 1) contained 300 ppm antimony (in diantimony trioxide), 30 ppm cobalt (in cobalt acetate), 88 ppm manganese (in manganese acetate), and 47 ppm phosphorus (in disodium monohydrogen phosphate).

The poly(ethylene terephthalate) prepared from Example 4 was analyzed for their color and intrinsic viscosity, and the results are summarized in Table 1. The measured L and b values and the measured intrinsic viscosity from Example 4 are 78.4, 1.0, and 0.66 dl/g, respectively.

EXAMPLE 5

The procedure in making poly(ethylene terephthalate) in Example 5 was identical to that described in Comparative Example 1, except that the catalyst composition (described as Sb/Co/Mn/P=300/30/88/47C in Table 1) contained 300 ppm antimony (in diantimony trioxide), 30 ppm cobalt (in cobalt acetate), 88 ppm manganese (in manganese acetate), and 47 ppm phosphorus (in disodium monohydrogen phosphite).

The poly(ethylene terephthalate) prepared from Example 5 was analyzed for their color and intrinsic viscosity, and the results are summarized in Table 1. The measured L and b values and the measured intrinsic viscosity from Example 5 are 76.4, 2.1, and 0.64 dl/g, respectively.

EXAMPLE 6

The procedure in making poly(ethylene terephthalate) in Example 6 was identical to that described in Comparative Example 1, except that the catalyst composition (described as Sb/Co/Mn/P=300/30/88/47D in Table 1) contained 300 ppm antimony (in diantimony trioxide), 30 ppm cobalt (in cobalt acetate), 88 ppm manganese (in manganese acetate), and 47 ppm phosphorus (in dipotassium monohydrogen phosphate).

The poly(ethylene terephthalate) prepared from Example 6 was analyzed for their color and intrinsic viscosity, and the results are summarized in Table 1. The measured L and b values and the measured intrinsic viscosity from Example 6 are 77.4, 0.0, and 0.64 dl/g, respectively.

EXAMPLE 7

The procedure in making poly(ethylene terephthalate) in Example 7 was identical to that described in Comparative Example 1, except that the catalyst composition (described as Sb/Co/Mn/P=300/30/88/47E in Table 1) contained 300 ppm antimony (in diantimony trioxide), 30 ppm cobalt (in cobalt acetate), 88 ppm manganese (in manganese acetate), and 47 ppm phosphorus (in sodium hypophosphite).

The poly(ethylene terephthalate) prepared from Example 7 was analyzed for their color and intrinsic viscosity, and the results are summarized in Table 1. The measured L and b values and the measured intrinsic viscosity from Example 7 are 69.5, 1.6, and 0.62 dl/g, respectively.

The b-values in Table 1 show that the addition of the alkali metal salt of the present invention to the catalyst composition improves the color of the poly(ethylene terephthalate) product.

EXAMPLE 9

The procedure in making poly(ethylene terephthalate) in Example 9 was identical to that described in Comparative Example 2, except that the catalyst composition (described as Sb/Mn/Zn/P=300/88/43/47B in Table 2) contained 300

TABLE 1

|  | Catalyst Composition | Polymerization Time (minutes) | Intrinsic Viscosity (dl/g) | L-value | b-value |
| --- | --- | --- | --- | --- | --- |
| Comp. Ex. 1 | Sb/Co/Mn = 300/30/88 | 43 | 0.65 | 78.4 | 3.3 |
| Example 1 | Sb/Co/Mn/P = 300/30/88/47A | 36 | 0.66 | 82.4 | 0.6 |
| Example 2 | Sb/Co/Mn/P = 300/30/88/53 | 33 | 0.66 | 80.9 | 2.9 |
| Example 3 | Sb/Co/Mn/P = 300/30/88/28 | 56 | 0.65 | 79.9 | 3.1 |
| Example 4 | Sb/Co/Mn/P = 300/30/88/47B | 40 | 0.66 | 78.4 | 1.0 |
| Example 5 | Sb/Co/Mn/P = 300/30/88/47C | 56 | 0.64 | 76.4 | 2.1 |
| Example 6 | Sb/Co/Mn/P = 300/30/88/47D | 49 | 0.64 | 77.4 | 0.0 |
| Example 7 | Sb/Co/Mn/P = 300/30/88/47E | 52 | 0.61 | 69.5 | 1.6 |

COMPARATIVE EXAMPLE 2

The procedure in making poly(ethylene terephthalate) in Comparative Example 2 was identical to that described in Comparative Example 1, except that the catalyst composition (described as Sb/Mn/Zn=300/88/43 in Table 2) contained 300 ppm antimony (in diantimony trioxide), 88 ppm manganese (in manganese acetate), and 43 ppm zinc (in zinc acetate).

The poly(ethylene terephthalate) prepared from Comparative Example 2 was analyzed for their color and intrinsic viscosity, and the results are summarized in Table 2. The measured L and b values and the measured intrinsic viscosity from Comparative Example 2 are 86.5, 4.6, and 0.63 dl/g, respectively.

EXAMPLE 8

The procedure in making poly(ethylene terephthalate) in Example 8 was identical to that described in Comparative Example 2, except that the catalyst composition (described as Sb/Mn/Zn/P=300/88/43/47A in Table 2) contained 300 ppm antimony (in diantimony trioxide), 88 ppm manganese (in manganese acetate), 43 ppm zinc (in zinc acetate), and 47 ppm phosphorus (in sodium tripolyphosphate).

The poly(ethylene terephthalate) prepared from Example 8 was analyzed for their color and intrinsic viscosity, and the results are summarized in Table 2. The measured L and b values and the measured intrinsic viscosity from Example 8 are 86.7, 3.9, and 0.62 dl/g, respectively.

ppm antimony (in diantimony trioxide), 88 ppm manganese (in manganese acetate), 43 ppm zinc (in zinc acetate), and 47 ppm phosphorus (in sodium dihydrogen hypophosphate).

The poly(ethylene terephthalate) prepared from Example 9 was analyzed for their color and intrinsic viscosity, and the results are summarized in Table 2. The measured L and b values and the measured intrinsic viscosity from Example 9 are 65.5, 1.6, and 0.59 dl/g, respectively.

EXAMPLE 10

The procedure in making poly(ethylene terephthalate) in Example 10 was identical to that described in Comparative Example 2, except that the catalyst composition (described as Sb/Mn/Zn/P=300/88/43/47C in Table 2) contained 300 ppm antimony (in diantimony trioxide), 88 ppm manganese (in manganese acetate), 43 ppm zinc (in zinc acetate), and 47 ppm phosphorus (in disodium monohydrogen phosphite).

The poly(ethylene terephthalate) prepared from Example 10 was analyzed for their color and intrinsic viscosity, and the results are summarized in Table 2. The measured L and b values and the measured intrinsic viscosity from Example 10 are 82.5, 3.1, and 0.64 dl/g, respectively.

The b-values in Table 2 show that the addition of the alkali metal salt of the present invention to the catalyst composition improves the color of the poly(ethylene terephthalate) product.

TABLE 2

|  | Catalyst Composition | Polymerization Time (minutes) | Intrinsic Viscosity (dl/g) | L-value | b-value |
| --- | --- | --- | --- | --- | --- |
| Comp. Ex. 2 | Sb/Mn/Zn = 300/88/43 | 28 | 0.63 | 86.5 | 4.6 |
| Example 8 | Sb/Mn/Zn/P = 300/88/43/47A | 27 | 0.62 | 86.7 | 3.9 |
| Example 9 | Sb/Mn/Zn/P = | 45 | 0.59 | 65.5 | 1.6 |

TABLE 2-continued

|  | Catalyst Composition | Polymerization Time (minutes) | Intrinsic Viscosity (dl/g) | L-value | b-value |
| --- | --- | --- | --- | --- | --- |
| Example 10 | 300/88/43/47B Sb/Mn/Zn/P = 300/88/43/47C | 38 | 0.64 | 82.5 | 3.1 |

COMPARATIVE EXAMPLE 3

The procedure in making poly(ethylene terephthalate) in Comparative Example 3 was identical to that described in Comparative Example 1, except that the catalyst composition (described as Sb/Co/Ca=300/30/36 in Table 3) contained 300 ppm antimony (in diantimony trioxide), 30 ppm cobalt (in cobalt acetate), and 36 ppm calcium (in calcium acetate).

The poly(ethylene terephthalate) prepared from Comparative Example 3 was analyzed for their color and intrinsic viscosity, and the results are summarized in Table 3. The measured L and b values and the measured intrinsic viscosity from Comparative Example 3 are 80.5, 3.8, and 0.65 dl/g, respectively.

EXAMPLE 11

The procedure in making poly(ethylene terephthalate) in Example 11 was identical to that described in Comparative Example 3, except that the catalyst composition (described as Sb/Co/Ca/P=300/30/36/47A in Table 3) contained 300 ppm antimony (in diantimony trioxide), 30 ppm cobalt (in cobalt acetate), 36 ppm calcium (in calcium acetate), and 47 ppm phosphorus (in sodium triphosphate).

The poly(ethylene terephthalate) prepared from Example 11 was analyzed for their color and intrinsic viscosity, and the results are summarized in Table 3. The measured L and b values and the measured intrinsic viscosity from Example 11 are 84.0, 0.4, and 0.67 dl/g, respectively.

EXAMPLE 12

The procedure in making poly(ethylene terephthalate) in Example 12 was identical to that described in Comparative Example 3, except that the catalyst composition (described as Sb/Co/Ca/P=300/30/36/47B in Table 3) contained 300 ppm antimony (in diantimony trioxide), 30 ppm cobalt (in cobalt acetate), 36 ppm calcium (in calcium acetate), and 47 ppm phosphorus (in sodium phosphate).

The poly(ethylene terephthalate) prepared from Example 12 was analyzed for their color and intrinsic viscosity, and the results are summarized in Table 3. The measured L and b values and the measured intrinsic viscosity from Example 12 are 70.5, 1.6, and 0.65 dl/g, respectively.

EXAMPLE 13

The procedure in making poly(ethylene terephthalate) in Example 13 was identical to that described in Comparative Example 3, except that the catalyst composition (described as Sb/Co/Ca/P=300/30/36/47C in Table 3) contained 300 ppm antimony (in diantimony trioxide), 30 ppm cobalt (in cobalt acetate), 36 ppm calcium (in calcium acetate), and 47 ppm phosphorus (in disodium monohydrogen phosphate).

The poly(ethylene terephthalate) prepared from Example 13 was analyzed for their color and intrinsic viscosity, and the results are summarized in Table 3. The measured L and b values and the measured intrinsic viscosity from Example 13 are 82.2, 1.2, and 0.70 dl/g, respectively.

The b-values in Table 3 show that the addition of the alkali metal salt of the present invention to the catalyst composition improves the color of the poly(ethylene terephthalate) product.

TABLE 3

|  | Catalyst Composition | Polymerization Time (minutes) | Intrinsic Viscosity (dl/g) | L-value | b-value |
| --- | --- | --- | --- | --- | --- |
| Comp. Ex. 3 | Sb/Co/Ca = 300/30/36 | 43 | 0.65 | 80.5 | 3.8 |
| Example 11 | Sb/Co/Ca/P = 300/30/36/47A | 48 | 0.67 | 84.0 | 0.4 |
| Example 12 | Sb/Co/Ca/P = 300/30/36/47B | 59 | 0.65 | 70.5 | 1.6 |
| Example 13 | Sb/Co/Ca/P = 300/30/36/47C | 49 | 0.70 | 82.2 | 1.2 |

COMPARATIVE EXAMPLE 4

The procedure in making poly(ethylene terephthalate) in Comparative Example 4 was identical to that described in Comparative Example 1, except that the catalyst composition (described as Sb/Co/Mg=300/25/36 in Table 4) contained 300 ppm antimony (in diantimony trioxide), 25 ppm cobalt (in cobalt acetate), and 36 ppm magnesium (in magnesium acetate).

The poly(ethylene terephthalate) prepared from Comparative Example 4 was analyzed for their color and intrinsic viscosity, and the results are summarized in Table 4. The measured L and b values and the measured intrinsic viscosity from Comparative Example 4 are 84.9, 4.5, and 0.64 dl/g, respectively.

EXAMPLE 14

The procedure in making poly(ethylene terephthalate) in Example 14 was identical to that described in Comparative Example 4, except that the catalyst composition (described as Sb/Co/Mg/P=300/25/36/47A in Table 4) contained 300 ppm antimony (in diantimony trioxide), 25 ppm cobalt (in cobalt acetate), 36 ppm magnesium (in magnesium acetate), and 47 ppm phosphorus (in sodium tripolyphosphate).

The poly(ethylene terephthalate) prepared from Example 14 was analyzed for their color and intrinsic viscosity, and the results are summarized in Table 4. The measured L and b values and the measured intrinsic viscosity from Example 14 are 82.3, 0.0, and 0.64 dl/g, respectively.

EXAMPLE 15

The procedure in making poly(ethylene terephthalate) in Example 15 was identical to that described in Comparative Example 4, except that the catalyst composition (described as Sb/Co/Mg/P=300/25/36/47B in Table 4) contained 300 ppm antimony (in diantimony trioxide), 25 ppm cobalt (in cobalt acetate), 36 ppm magnesium (in magnesium acetate), and 47 ppm phosphorus (in dipotassium monohydrogen phosphate).

The poly(ethylene terephthalate) prepared from Example 15 was analyzed for their color and intrinsic viscosity, and the results are summarized in Table 4. The measured L and b values and the measured intrinsic viscosity from Example 15 are 77.7, 1.6, and 0.65 dl/g, respectively.

The b-values in Table 4 show that the addition of the alkali metal salt of the present invention to the catalyst composition improves the color of the poly(ethylene terephthalate) product.

EXAMPLE 16

The procedure in making poly(ethylene terephthalate) in Example 16 was identical to that described in Comparative Example 5, except that the catalyst composition (described as Sb/Mg/Mn/P=300/36/88/47 in Table 5) contained 300 ppm antimony (in diantimony trioxide), 36 ppm magnesium (in magnesium acetate), 88 ppm manganese (in manganese acetate), and 47 ppm phosphorus (in sodium tripolyphosphate).

The poly(ethylene terephthalate) prepared from Example 16 was analyzed for their color and intrinsic viscosity, and the results are summarized in Table 5. The measured L and b values and the measured intrinsic viscosity from Example 16 are 84.5, 4.0, and 0.64 dl/g, respectively.

The b-values in Table 5 show that the addition of the alkali metal salt of the present invention to the catalyst composition improves the color of the poly(ethylene terephthalate) product.

TABLE 4

| | Catalyst Composition | Polymerization Time (minutes) | Intrinsic Viscosity (dl/g) | L-value | b-value |
| --- | --- | --- | --- | --- | --- |
| Comp. Ex. 4 | Sb/Co/Mg = 300/25/36 | 35 | 0.64 | 84.9 | 4.5 |
| Example 14 | Sb/Co/Mg/P = 300/25/36/47A | 40 | 0.64 | 82.3 | 0.0 |
| Example 15 | Sb/Co/Mg/P = 300/25/36/47B | 39 | 0.65 | 77.7 | 1.6 |

COMPARATIVE EXAMPLE 5

The procedure in making poly(ethylene terephthalate) in Comparative Example 5 was identical to that described in Comparative Example 1, except that the catalyst composition (described as Sb/Mg/Mn=300/36/88 in Table 5) contained 300 ppm antimony (in diantimony trioxide), 36 ppm magnesium (in magnesium acetate), and 88 ppm manganese (in manganese acetate).

TABLE 5

| | Catalyst Composition | Polymerization Time (minutes) | Intrinsic Viscosity (dl/g) | L-value | b-value |
| --- | --- | --- | --- | --- | --- |
| Comp. Ex. 5 | Sb/Mg/Mn = 300/36/88 | 32 | 0.63 | 78.7 | 4.4 |
| Example 16 | Sb/Mg/Mn/P = 300/36/88/47 | 29 | 0.64 | 84.5 | .0 |

The poly(ethylene terephthalate) prepared from Comparative Example 5 was analyzed for their color and intrinsic viscosity, and the results are summarized in Table 5. The measured L and b values and the measured intrinsic viscosity from Comparative Example 5 are 78.7, 4.4, and 0.63 dl/g, respectively.

COMPARATIVE EXAMPLE 6

The procedure in making poly(ethylene terephthalate) in Comparative Example 6 was identical to that described in Comparative Example 1, except that the catalyst composition (described as Sb/Mn/Ca=300/89/36 in Table 6) contained 300 ppm antimony (in diantimony trioxide), 89 ppm manganese (in manganese acetate), and 36 ppm calcium (in calcium acetate).

The poly(ethylene terephthalate) prepared from Comparative Example 6 was analyzed for their color and intrinsic viscosity, and the results are summarized in Table 6. The measured L and b values and the measured intrinsic viscosity from Comparative Example 6 are 75.6, 4.9, and 0.62 dl/g, respectively.

EXAMPLE 17

The procedure in making poly(ethylene terephthalate) in Example 17 was identical to that described in Comparative Example 6, except that the catalyst composition (described as Sb/Mn/Ca/P=300/89/36/47 in Table 6) contained 300 ppm antimony (in diantimony trioxide), 89 ppm manganese (in manganese acetate), 36 ppm calcium (in calcium acetate) and 47 ppm phosphorus (in sodium tripoly phosphate).

The poly(ethylene terephthalate) prepared from Example 17 was analyzed for their color and intrinsic viscosity, and the results are summarized in Table 6. The measured L and b values and the measured intrinsic viscosity from Example 17 are 85.0, 4.8, and 0.66 dl/g, respectively.

The b-values in Table 6 show that the addition of the alkali metal salt of the present invention to the catalyst composition improves the color of the poly(ethylene terephthalate) product.

Example 7, except that the catalyst composition (described as Sb/Ca/Zn/P=300/36/43/47 in Table 7) contained 300 ppm antimony (in diantimony trioxide), 36 ppm calcium (in calcium acetate), 43 ppm zinc (in zinc acetate), and 47 ppm phosphorus (in sodium tripolyphosphate).

The poly(ethylene terephthalate) prepared from Example 18 was analyzed for their color and intrinsic viscosity, and the results are summarized in Table 7. The measured L and b values and the measured intrinsic viscosity from Example 18 are 85.5, 4.7, and 0.65 dl/g, respectively.

The b-values in Table 7 show that the addition of the alkali metal salt of the present invention to the catalyst composition improves the color of the poly(ethylene terephthalate) product.

TABLE 6

|  | Catalyst Composition | Polymerization Time (minutes) | Intrinsic Viscosity (dl/g) | L-value | b-value |
| --- | --- | --- | --- | --- | --- |
| Comp. Ex. 6 | Sb/Mn/Ca = 300/89/36 | 37 | 0.62 | 75.6 | 4.9 |
| Example 17 | Sb/Mn/Ca/P = 300/89/36/47 | 40 | 0.66 | 85.0 | 4.8 |

COMPARATIVE EXAMPLE 7

The procedure in making poly(ethylene terephthalate) in Comparative Example 7 was identical to that described in Comparative Example 1, except that the catalyst composition (described as Sb/Ca/Zn=300/36/43 in Table 7) contained 300 ppm antimony (in diantimony trioxide), 36 ppm calcium (in calcium acetate), and 43 ppm zinc (in zinc acetate).

The poly(ethylene terephthalate) prepared from Comparative Example 7 was analyzed for their color and intrinsic viscosity, and the results are summarized in Table 7. The measured L and b values and the measured intrinsic viscosity from Comparative Example 7 are 86.5, 5.7, and 0.61 dl/g, respectively.

EXAMPLE 18

The procedure in making poly(ethylene terephthalate) in Example 18 was identical to that described in Comparative

TABLE 7

|  | Catalyst Composition | Polymerization Time (minutes) | Intrinsic Viscosity (dl/g) | L-value | b-value |
| --- | --- | --- | --- | --- | --- |
| Comp. Ex. 7 | Sb/Ca/Zn = 300/36/43 | 26 | 0.61 | 86.5 | 5.7 |
| Example 18 | Sb/Ca/Zn/P = 300/36/43/47 | 33 | 0.65 | 85.5 | 4.7 |

COMPARATIVE EXAMPLE 8

The procedure in making poly(ethylene terephthalate) in Comparative Example 8 was identical to that described in Comparative Example 1, except that the catalyst composition (described as Sb/Mg/Zn=300/36/43 in Table 8) contained 300 ppm antimony (in diantimony trioxide), 36 ppm magnesium (in magnesium acetate), and 43 ppm zinc (in zinc acetate).

The poly(ethylene terephthalate) prepared from Comparative Example 8 was analyzed for their color and intrinsic viscosity, and the results are summarized in Table 8. The measured L and b values and the measured intrinsic viscosity from Comparative Example 8 are 81.9, 9.9, and 0.58 dl/g, respectively.

EXAMPLE 19

The procedure in making poly(ethylene terephthalate) in Example 19 was identical to that described in Comparative Example 8, except that the catalyst composition (described as Sb/Mg/Zn/P=300/36/43/47 in Table 8) contained 300 ppm antimony (in diantimony trioxide), 36 ppm magnesium (in magnesium acetate), 43 ppm zinc (in zinc acetate), and 47 ppm phosphorus (in sodium tripolyphosphate).

The b-values in Table 8 show that the addition of the alkali metal acetate of the present invention to the catalyst composition improves the color of the poly(ethylene terephthalate) product.

TABLE 8

|  | Catalyst Composition | Polymerization Time (minutes) | Intrinsic Viscosity (dl/g) | L-value | b-value |
| --- | --- | --- | --- | --- | --- |
| Comp. Ex. 8 | Sb/Mg/Zn = 300/36/43 | 56 | 0.58 | 81.9 | 9.9 |
| Example 19 | Sb/Mg/Zn/P = 300/36/43/47 | 34 | 0.66 | 84.2 | 5.7 |

COMPARATIVE EXAMPLE 9

The procedure in making poly(ethylene terephthalate) in Comparative Example 9 was identical to that described in Comparative Example 1, except that the catalyst composition (described as Sb/Co/Mn=175/42/21 in Table 9) contained 175 ppm antimony (in antimony acetate), 42 ppm cobalt (in cobalt acetate), and 21 ppm manganese (in manganese acetate).

The poly(ethylene terephthalate) prepared from Comparative Example 9 was analyzed for their color and intrinsic viscosity, and the results are summarized in Table 9. The measured L and b values and the measured intrinsic viscosity from Comparative Example 9 are 81.5, 2.9, and 0.64 dl/g, respectively.

EXAMPLE 20

The procedure in making poly(ethylene terephthalate) in Example 20 was identical to that described in Comparative Example 9, except that the catalyst composition (described as Sb/Co/Mn/P=175/42/21/28A in Table 9) contained 175 ppm antimony (in antimony acetate), 42 ppm cobalt (in cobalt acetate), 21 ppm manganese (in manganese acetate), and 47 ppm phosphorus (in sodium phosphate).

The poly(ethylene terephthalate) prepared from Example 20 was analyzed for their color and intrinsic viscosity, and the results are summarized in Table 9. The measured L and b values and the measured intrinsic viscosity from Example 20 are 77.5, 2.0, and 0.65 dl/g, respectively.

EXAMPLE 21

The procedure in making poly(ethylene terephthalate) in Example 21 was identical to that described in Comparative Example 9, except that the catalyst composition (described as Sb/Co/Mn/P=175/42/21/28B in Table 9) contained 175 ppm antimony (in antimony acetate), 42 ppm cobalt (in cobalt acetate), 21 ppm manganese (in manganese acetate), and 47 ppm phosphorus (in sodium tripolyphosphate).

The poly(ethylene terephthalate) prepared from Example 21 was analyzed for their color and intrinsic viscosity, and the results are summarized in Table 9. The measured L and b values and the measured intrinsic viscosity from Example 21 are 76.5, 1.9, and 0.64 dl/g, respectively.

The b-values in Table 9 show that the addition of the alkali metal salt of the present invention to the catalyst composition improves the color of the poly(ethylene terephthalate) product.

TABLE 9

|  | Catalyst Composition | Polymerization Time (minutes) | Intrinsic Viscosity (dl/g) | L-value | b-value |
| --- | --- | --- | --- | --- | --- |
| Comp. Ex. 9 | Sb/Co/Mn = 175/42/21 | 90 | 0.64 | 81.5 | 2.9 |
| Example 20 | Sb/Co/Mn/P = 175/42/21/28A | 78 | 0.65 | 77.5 | 2.0 |
| Example 21 | Sb/Co/Mn/P = 175/42/21/28B | 75 | 0.64 | 76.5 | 1.9 |

COMPARATIVE EXAMPLE 10

The procedure in making poly(ethylene terephthalate) in Comparative Example 10 was identical to that described in Comparative Example 1, except that the catalyst composition (described as Sb/Ca=300/36 in Table 10) contained 300 ppm antimony (in diantimony trioxide) and 36 ppm calcium (in calcium acetate).

The poly(ethylene terephthalate) prepared from Comparative Example 10 was analyzed for their color and intrinsic viscosity, and the results are summarized in Table 10. The measured L and b values and the measured intrinsic viscosity from Comparative Example 10 are 85.8, 6.7, and 0.66 dl/g, respectively.

EXAMPLE 22

The procedure in making poly(ethylene terephthalate) in Example 22 was identical to that described in Comparative Example 10, except that the catalyst composition (described as Sb/Ca/P=300/36/47 in Table 10) contained 300 ppm antimony (in diantimony trioxide) 36 ppm calcium (in calcium acetate), and 47 ppm phosphorus (in sodium tripolyphosphate).

The poly(ethylene terephthalate) prepared from Example 22 was analyzed for their color and intrinsic viscosity, and the results are summarized in Table 10. The measured L and b values and the measured intrinsic viscosity from Example 22 are 86.1, 5.0, and 0.65 dl/g, respectively.

The b-values in Table 10 show that the addition of the alkali metal salt of the present invention to the catalyst composition improves the color of the poly(ethylene terephthalate) product.

composition improves the color of the poly(ethylene terephthalate) product.

In all the examples and comparative examples described above, the addition of the phosphorus salt to a antimony based catalyst composition always resulted in the reduction of b-value, indicating a reduction of the yellowness of the poly(ethylene terephthalate) product and a reduction of undesired side reaction product. These comparisons clearly illustrate the advantageous properties of the catalyst composition of the present invention.

TABLE 10

|  | Catalyst Composition | Polymerization Time (minutes) | Intrinsic Viscosity (dl/g) | L-value | b-value |
| --- | --- | --- | --- | --- | --- |
| Comp. Ex. 10 | Sb/Ca = 300/36 | 48 | 0.66 | 85.8 | 6.7 |
| Example 22 | Sb/Ca/P = 300/36/47 | 54 | 0.65 | 86.1 | 5.0 |

COMPARATIVE EXAMPLE 11

The procedure in making poly(ethylene terephthalate) in Comparative Example 9 was identical to that described in Comparative Example 1, except that the catalyst composition (described as Sb/Co/Mn/Pb=300/30/88/20 in Table 11) contained 300 ppm antimony (in diantimony trioxide), 30 ppm cobalt (in cobalt acetate), 88 ppm manganese (in manganese acetate), and 20 ppm lead (in lead acetate).

The poly(ethylene terephthalate) prepared from Comparative Example 11 was analyzed for their color and intrinsic viscosity, and the results are summarized in Table 11. The measured L and b values and the measured intrinsic viscosity from Comparative Example 11 are 83.3, 1.3, and 0.65 dl/g, respectively.

EXAMPLE 23

The procedure in making poly(ethylene terephthalate) in Example 23 was identical to that described in Comparative Example 11, except that the catalyst composition (described as Sb/Co/Mn/Pb/P=300/30/88/20/47 in Table 11) contained 300 ppm antimony (in diantimony trioxide), 30 ppm cobalt (in cobalt acetate), 80 ppm manganese (in manganese acetate), 20 ppm lead (in lead acetate), and 47 ppm phosphorus (in sodium tripolyphosphate).

The poly(ethylene terephthalate) prepared from Example 23 was analyzed for their color and intrinsic viscosity, and the results are summarized in Table 11. The measured L and b values and the measured intrinsic viscosity from Example 23 are 80.2, 1.0, and 0.64 dl/g, respectively.

The b-values in Table 11 show that the addition of the alkali metal salt of the present invention to the catalyst

TABLE 11

|  | Catalyst Composition | Polymerization Time (minutes) | Intrinsic Viscosity (dl/g) | L-value | b-value |
| --- | --- | --- | --- | --- | --- |
| Comp. Ex. 11 | Sb/Co/Mn/Pb/P = 300/30/88/20/47 | 40 | 0.65 | 83.3 | 1.3 |
| Example 23 | Sb/Co/Mn/Pb/P = 300/30/88/20/47 | 38 | 0.64 | 80.2 | 1.0 |

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A process for the preparation of poly(ethylene terephthalate) from terephthalic acid and ethylene glycol comprising the steps of:
   (a) preparing a catalyst composition containing:
      (i) an antimony salt catalyst present in a range from about 10 to about 1,000 ppm;
      (ii) a metal salt catalyst selected from the group consisting of cobalt, magnesium, zinc, manganese, calcium, and lead salts, present in a range from about 10 to about 500 ppm; and
      (iii) a phosphorus salt co-catalyst selected from the group consisting of alkali metal phosphates, alkali metal phosphites, alkali metal hypophosphites and alkali metal polyphosphates, present in a range from about 10 to about 500 ppm; wherein all the ppm values are based on the theoretical yield of said poly(ethylene terephthalate), by weight, to be made from said terephthalic acid and ethylene glycol;

(b) placing said catalyst composition, said terephthalic acid and said ethylene glycol in a reaction vessel, wherein said ethylene glycol and said terephthalic acid are provided in a ratio of about 1.2:1;

(c) raising reaction temperature to about 200°–280° C. to start an esterification reaction between said terephthalic acid and said ethylene glycol;

(d) raising reaction temperature to about 250°–300° C. and applying vacuum in said reaction vessel to start a polymerization reaction; and (e) removing unreacted ethylene glycol to obtain said poly(ethylene terephthalate).

2. A process for the preparation of poly(ethylene terephthalate) from terephthalic acid and ethylene glycol according to claim 1 wherein said poly(ethylene terephthalate) is prepared from esterification and subsequent condensation polymerization of said terephthalic acid with ethylene glycol monomer.

3. A process for the preparation of poly(ethylene terephthalate) from terephthalic acid and ethylene glycol according to claim 1 wherein said antimony salt catalyst is selected from the group consisting of antimony oxides and antimony carbonates.

4. A process for the preparation of poly(ethylene terephthalate) from terephthalic acid and ethylene glycol according to claim 1 wherein said antimony salt catalyst is diantimony trioxide or antimony acetate.

5. A process for the preparation of poly(ethylene terephthalate) from terephthalic acid and ethylene glycol according to claim 1 wherein said antimony salt catalyst is present in a range from about 30 to about 600 ppm.

6. A process for the preparation of poly(ethylene terephthalate) from terephthalic acid and ethylene glycol according to claim 1 wherein said metal salt catalyst is selected from the group consisting of cobalt carbonate, magnesium carbonate, zinc carbonate, manganese carbonate, calcium carbonate, and lead carbonate.

7. A process for the preparation of poly(ethylene terephthalate) from terephthalic acid and ethylene glycol according to claim 1 wherein said metal salt catalyst is selected from the group consisting of cobalt acetate, magnesium acetate, zinc acetate, manganese acetate, calcium acetate, and lead acetate.

8. A process for the preparation of poly(ethylene terephthalate) from terephthalic acid and ethylene glycol according to claim 1 wherein said metal salt catalyst is present in a range from about 20 to about 300 ppm.

9. A process for the preparation of poly(ethylene terephthalate) from terephthalic acid and ethylene glycol according to claim 1 wherein said phosphorus salt co-catalyst is an alkali metal phosphate containing one, two, or three metals.

10. A process for the preparation of poly(ethylene terephthalate) from terephthalic acid and ethylene glycol according to claim 9 wherein said alkali metal is lithium, sodium, or potassium.

11. A process for the preparation of poly(ethylene terephthalate) from terephthalic acid and ethylene glycol according to claim 1 wherein said phosphorus salt co-catalyst is an alkali metal phosphite containing one or two metals.

12. A process for the preparation of poly(ethylene terephthalate) from terephthalic acid and ethylene glycol according to claim 11 wherein said alkali metal is lithium, sodium, or potassium.

13. A process for the preparation of poly(ethylene terephthalate) from terephthalic acid and ethylene glycol according to claim 1 wherein said phosphorus salt co-catalyst is an alkali metal hypophosphate.

14. A process for the preparation of poly(ethylene terephthalate) from terephthalic acid and ethylene glycol according to claim 13 wherein said alkali metal is lithium, sodium, or potassium.

15. A process for the preparation of poly(ethylene terephthalate) from terephthalic acid and ethylene glycol according to claim 1 wherein said phosphorus salt co-catalyst is an alkali metal polyphosphate containing one, two, three, four, or five metals.

16. A process for the preparation of poly(ethylene terephthalate) from terephthalic acid and ethylene glycol according to claim 15 wherein said alkali metal is lithium, sodium, or potassium.

17. A process for the preparation of poly(ethylene terephthalate) from terephthalic acid and ethylene glycol according to claim 1 wherein said phosphorus salt co-catalyst is present in a range from about 20 to about 500 ppm.

18. A process for the preparation of poly(ethylene terephthalate) from terephthalic acid and ethylene glycol according to claim 1 wherein said antimony salt catalyst is selected from the group consisting of diantimony trioxide and diantimony trioxide, and said metal salt catalyst is selected from the group consisting of carbonates and acetates of cobalt, magnesium, zinc, manganese, calcium and lead.

* * * * *